(12) United States Patent
Yoon

(10) Patent No.: US 12,440,061 B2
(45) Date of Patent: Oct. 14, 2025

(54) COOKING APPLIANCE CONTROL METHOD USING ARTIFICIAL INTELLIGENCE AND SYSTEM THEREOF

(71) Applicant: LG ELECTRONICS INC., Seoul (KR)

(72) Inventor: Yoosool Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 755 days.

(21) Appl. No.: 17/641,295

(22) PCT Filed: Jul. 22, 2020

(86) PCT No.: PCT/KR2020/009651
§ 371 (c)(1),
(2) Date: Mar. 8, 2022

(87) PCT Pub. No.: WO2021/049751
PCT Pub. Date: Mar. 18, 2021

(65) Prior Publication Data
US 2022/0287500 A1 Sep. 15, 2022

(30) Foreign Application Priority Data
Sep. 10, 2019 (KR) .......................... 10-2019-0112426

(51) Int. Cl.
*A47J 36/32* (2006.01)
*F24C 7/08* (2006.01)
(Continued)

(52) U.S. Cl.
CPC ............. *A47J 36/321* (2018.08); *F24C 7/081* (2013.01); *F24C 7/085* (2013.01); *G06V 10/70* (2022.01);
(Continued)

(58) Field of Classification Search
CPC ......... A47J 36/321; F24C 7/081; F24C 7/086; F27D 2021/026; F27D 21/02;
(Continued)

(56) References Cited

U.S. PATENT DOCUMENTS

2019/0053332 A1* 2/2019 Cheng .................... F24C 7/046
2019/0200797 A1* 7/2019 Diao ...................... G05B 19/42
(Continued)

FOREIGN PATENT DOCUMENTS

JP 2003-307313 A 10/2003
KR 10-0518400 B1 9/2005
(Continued)

*Primary Examiner* — Reginald Alexander
(74) *Attorney, Agent, or Firm* — Birch, Stewart, Kolasch & Birch, LLP

(57) ABSTRACT

The present disclosure relates to a cooking appliance control method using artificial intelligence and a system thereof. The cooking appliance control method includes: performing vision recognition of an image of a product to be cooked captured by a user equipment, and obtaining information on the product to be cooked; retrieving a recipe to be applied to the product to be cooked, on the basis of the information on the product to be cooked; loading information on a cooking appliance registered in a user account; generating a cooking command for the registered cooking appliance by using the recipe, and providing the cooking command to the user equipment; and controlling the registered cooking appliance by the user equipment in accordance with the cooking command.

9 Claims, 11 Drawing Sheets

(51) Int. Cl.
*G06V 10/70* (2022.01)
*F27D 21/02* (2006.01)
*G06V 20/68* (2022.01)

(52) U.S. Cl.
CPC ............... *F27D 2021/026* (2013.01); *G05B 2219/2643* (2013.01); *G06V 20/68* (2022.01)

(58) Field of Classification Search
CPC ............... G05B 15/02; G05B 19/04; G05B 2219/2643; G06V 10/70; G06V 20/68; H05B 6/6447
See application file for complete search history.

(56) References Cited

U.S. PATENT DOCUMENTS

| | | | |
|---|---|---|---|
| 2019/0234617 A1* | 8/2019 | Bhogal | F24C 3/124 |
| 2021/0043108 A1* | 2/2021 | Baumback | G06F 40/284 |
| 2022/0273139 A1* | 9/2022 | Mahapatra | G05B 13/0265 |

FOREIGN PATENT DOCUMENTS

| | | |
|---|---|---|
| KR | 10-1457087 B1 | 10/2014 |
| KR | 10-2017-0138205 A | 12/2017 |
| KR | 10-2019-0096851 A | 8/2019 |

* cited by examiner

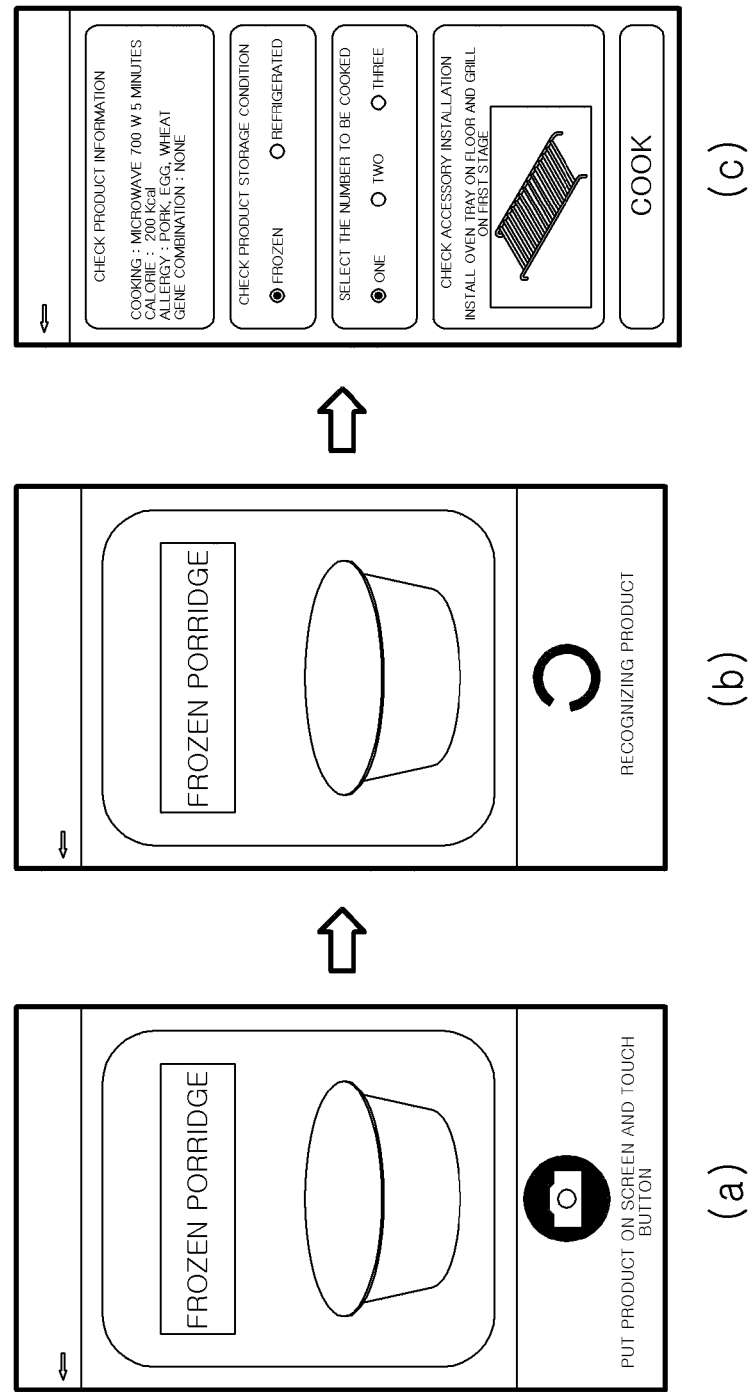

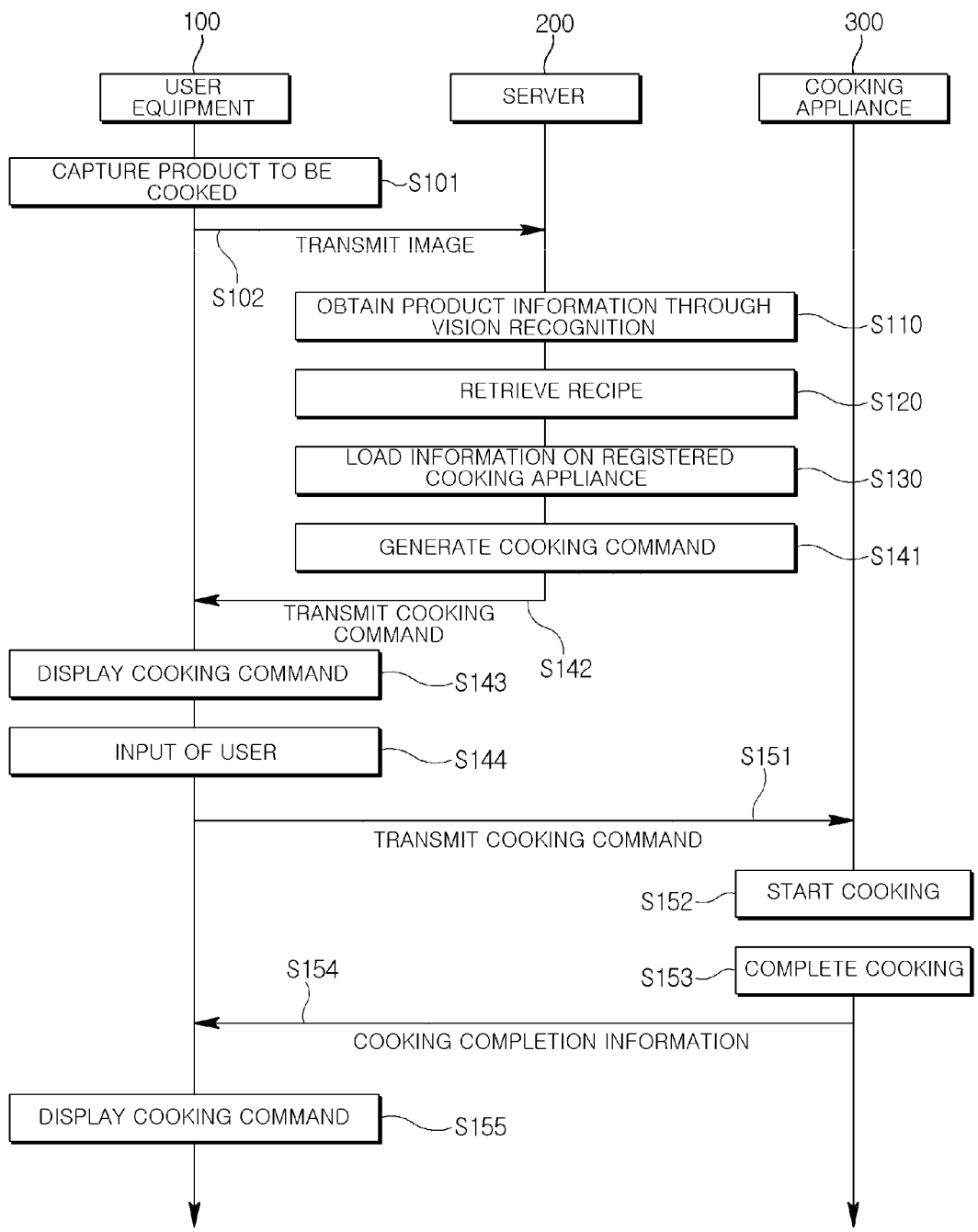

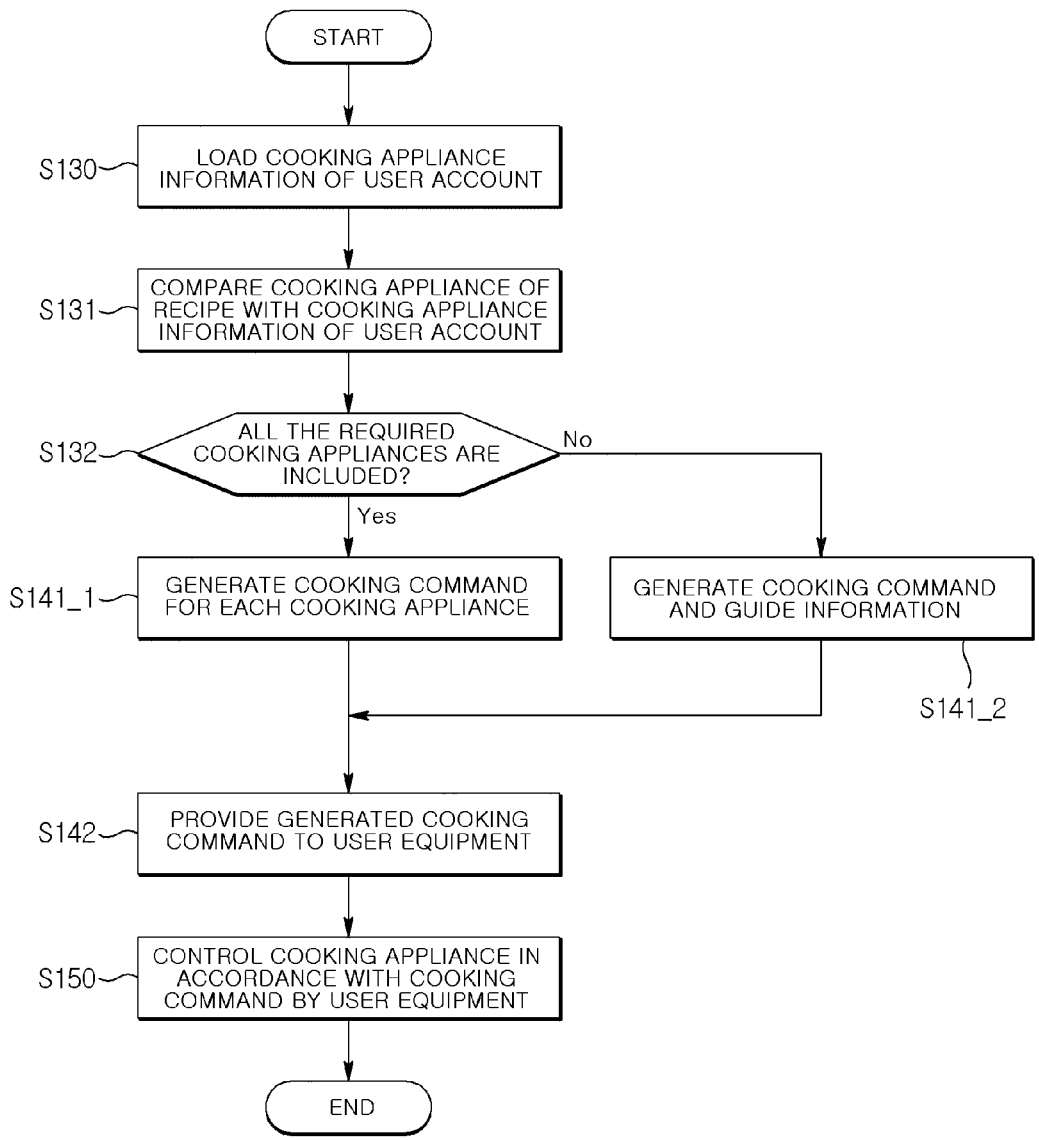

COOKING APPLIANCE CONTROL METHOD USING ARTIFICIAL INTELLIGENCE AND SYSTEM THEREOF

CROSS REFERENCE TO RELATED APPLICATIONS

This application is the National Phase of PCT/KR2020/009651 filed on Jul. 22, 2020, which claims priority under 35 U.S.C. § 119 (a) to Patent Application No. 10-2019-0112426 filed in the Republic of Korea on Sep. 10, 2019, all of which are hereby expressly incorporated by reference into the present application.

BACKGROUND OF THE INVENTION

Field of the Invention

The present disclosure relates to a cooking appliance control method using artificial intelligence and a system thereof. More particularly, the present disclosure relates to a method for automatically recognizing, by using artificial intelligence, product information through an image of a product to be cooked and for providing a cooking command to the cooking appliance, and a system thereof.

Description of the Related Art

With the development of technology, devices equipped with artificial intelligence (AI) have been widely introduced. In particular, a technology capable of retrieving information by recognizing text or images by using artificial intelligence is widely used, and a service using such artificial intelligence is also being applied to home appliances including cooking appliances.

The cooking appliance controls a cooking process by using various operation methods. However, because a user has insufficient knowledge of cooking commands corresponding to recipes for cooking ingredients or, for convenience, selects a cooking time-oriented simple operation method instead of selecting an operation method based on cooking ingredients, there is a disadvantage that recipes recommended according to cooking ingredients cannot be applied to the cooking process using cooking equipment.

Consumption of home meal replacement (HMR) is increasing thanks to the convenience of cooking at home. The HMR is a generic term for products which are pre-cooked to a certain extent, processed and packaged, are provided to the user, and allow the user to complete the food through a simple cooking process such as heating or boiling.

SUMMARY OF THE INVENTION

Technical Problem

One purpose of the present disclosure is to provide a method for automatically recognizing, by using artificial intelligence, a product to be cooked and for providing a cooking command to a cooking appliance.

Another purpose of the present disclosure is to provide a system for automatically recognizing, by using artificial intelligence, a product to be cooked and for providing a cooking command to a cooking appliance.

The technical problem to be overcome by the present disclosure is not limited to the above-mentioned technical problems. Other technical problems not mentioned can be clearly understood from the following descriptions of the present disclosure by a person having ordinary skill in the art.

Technical Solution

One embodiment is a cooking appliance control method using artificial intelligence. The cooking appliance control method includes: obtaining information on the product to be cooked by performing vision recognition of an image of a product to be cooked captured by a user equipment; retrieving a recipe to be applied to the product to be cooked, on the basis of the information on the product to be cooked; loading information on a cooking appliance registered in a user account; generating a cooking command for the registered cooking appliance by using the recipe, and providing the cooking command to the user equipment; and controlling the registered cooking appliance by the user equipment in accordance with the cooking command.

The controlling the registered cooking appliance by the user equipment in accordance with the cooking command may include: displaying, on a display of the user equipment, details of the cooking command and a cooking appliance to be controlled by the cooking command; and receiving a user input and controlling the displayed cooking appliance by the user equipment.

The receiving the user input and controlling the displayed cooking appliance by the user equipment may include generating a cooking command changed by modifying the details of the cooking command by the user input.

The cooking appliance control method may further include generating a user cooking characteristic learning model by using the changed cooking command.

The cooking appliance control method may further include receiving, by the user equipment, storage environment information of the product to be cooked. The user equipment may control the registered cooking appliance in accordance with the cooking command to which the storage environment information has been applied.

When the storage environment information of the product to be cooked is a frozen storage, a cooking time or a cooking temperature among the cooking command for the registered cooking appliance may be increased.

When there is a plurality of the cooking appliances capable of cooking the product to be cooked among the registered cooking appliances, the generating the cooking command and providing the cooking command to the user equipment may include generating cooking commands for the plurality of the cooking appliances respectively and providing the cooking commands to the user equipment.

When the registered cooking appliance does not include a cooking appliance required for the recipe, the generating the cooking command and providing the cooking command to the user equipment may provide the user equipment with both the control command to be provided to the registered cooking appliance and information on a cooking method used in the cooking appliance required for the recipe.

The user equipment may output, on a display or in the form of sound, the information on the cooking method used in the cooking appliance required for the recipe.

The image of the product to be cooked may include at least one of a packaging image of the product to be cooked, a logo image of the product to be cooked, and a content image of the product to be cooked.

Another embodiment is a cooking appliance control system using artificial intelligence. The cooking appliance control system includes: a user equipment which captures an image of a product to be cooked; and a server which performs vision recognition of the image and obtains information on the product to be cooked. The server retrieves a recipe to be applied to the product to be cooked, on the basis of the information on the product to be cooked, generates a cooking command to be applied to a cooking appliance registered in a user account by using the recipe, and transmits the cooking command to the user equipment. The user equipment controls the registered cooking appliance in accordance with the cooking command.

The user equipment may include: a display which displays details of the cooking command and displays a cooking appliance to be controlled by the cooking command; and an input interface which receives a user input for controlling the cooking appliance displayed on the display.

The user equipment may include generating a cooking command changed by modifying the details of the cooking command by the user input.

The user equipment may transmit the changed cooking command to the server, and the server may generate a user cooking characteristic learning model by using the changed cooking command.

The user equipment may receive storage environment information of the product to be cooked, and may control the registered cooking appliance in accordance with the cooking command to which the storage environment information has been applied.

When the storage environment information of the product to be cooked is a frozen storage, the user equipment may modify the cooking command by increasing a cooking time or a cooking temperature among the cooking command for the registered cooking appliance.

When there is a plurality of the cooking appliances capable of cooking the product to be cooked among the registered cooking appliances, the server may include generating cooking commands for the plurality of the cooking appliances respectively and providing the cooking commands to the user equipment.

When the registered cooking appliance does not include a cooking appliance required for the recipe, the server may provide the user equipment with both the control command to be provided to the registered cooking appliance and information on a cooking method used in the cooking appliance required for the recipe.

The user equipment may output, on a display or in the form of sound, the information on the cooking method used in the cooking appliance required for the recipe.

Other details of the embodiments are included in the detailed description and drawings.

Advantageous Effects

The cooking appliance control method using artificial intelligence and system thereof according to the embodiments of the present disclosure perform vision recognition of a result of capturing, with a user equipment, a product to be cooked, and provide a cooking command corresponding to the product to be cooked to the cooking appliance. Through this, the user is able to automatically control the cooking appliance without having to read a cooking method printed on the packaging of the product to be cooked, etc. This can improve user experiences with the cooking appliance.

Also, the system may generate a user cooking characteristic learning model and store it in a user database. When generating the cooking command for the cooking appliance on the basis of a retrieved recipe, a server may generate the cooking command reflecting the user cooking characteristic learning model. Accordingly, the system may control the cooking appliance through the cooking command suitable for the user's cooking characteristics.

Also, when the cooking appliance which is not owned by the user or is not registered in the user account is included in the recipe of the product to be cooked, the system allows the user equipment to output guide information that can replace the cooking appliance, so that it is possible to make it easier to cook the product to be cooked.

Advantageous effects of the present disclosure are not limited to the above-described effects and other unmentioned effects can be clearly understood from the description of the claims by those skilled in the art to which the present disclosure belongs.

BRIEF DESCRIPTION OF THE DRAWINGS

FIG. 9 is a view for describing contents displayed on a display unit of the user equipment which performs the cooking appliance control method according to some embodiments of the present disclosure;

FIG. 10 is a data flowchart for describing the cooking appliance control method according to some embodiments of the present disclosure; and FIG. 11 is a flowchart for describing the cooking appliance control method according to some other embodiments of the present disclosure.

DETAILED DESCRIPTION OF THE INVENTION

Figure 1:
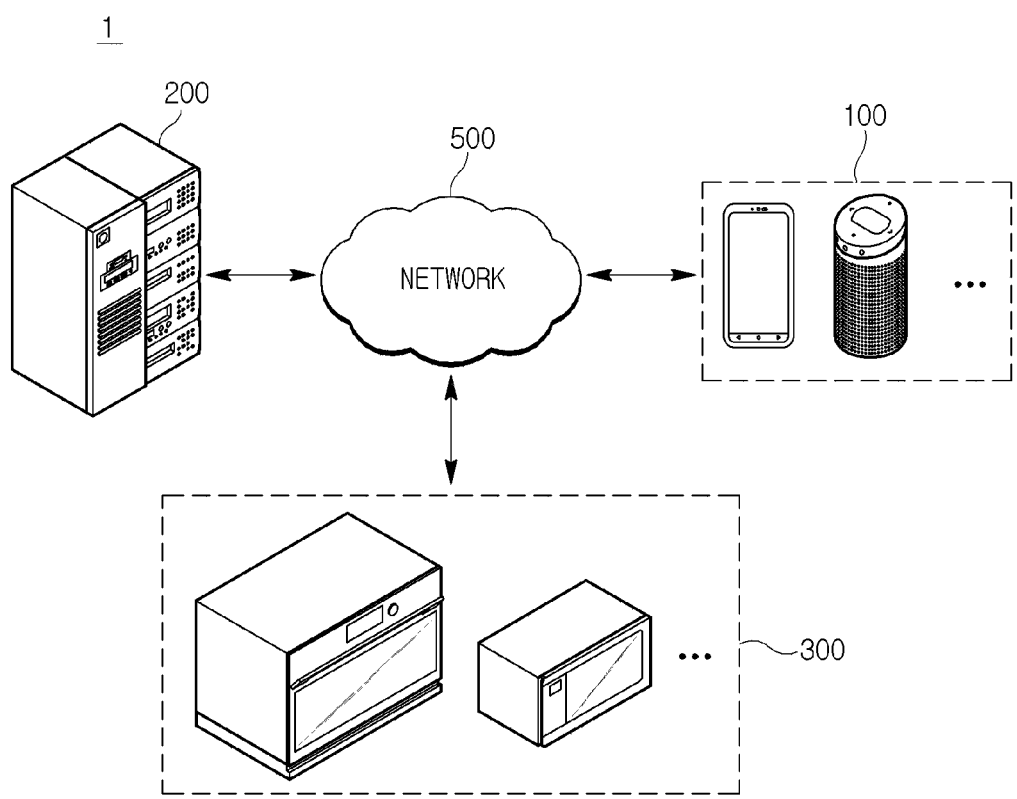
FIG. 1 is a view for describing a cooking appliance control system using artificial intelligence according to some embodiments of the present disclosure.

Hereinafter, embodiments described in the specification will be described in detail with reference to the accompanying drawings. Regardless of reference numerals, the same or similar elements are denoted by the same reference numerals, and a duplicated description thereof will be omitted. The suffix "module" and "unit" for the element used in the following description is merely intended to facilitate description of the specification, and the suffix itself does not have a meaning or function distinguished from others. In addition, in describing the embodiments described in the specification, if it is decided that the detailed description of the known art related to the present disclosure makes the subject matter of the present disclosure unclear, the detailed description will be omitted. In addition, the accompanying drawings are only to easily understand an embodiment described in the specification. It is to be understood that the technical idea described in the specification is not limited by the accompanying drawings, but includes all modifications, equivalents, and substitutions included in the spirit and the scope of the present disclosure.

Terms including ordinal numbers, such as "first", "second", etc. can be used to describe various elements, but the elements are not to be construed as being limited to the terms. The terms are only used to differentiate one element from other elements.

It will be understood that when an element is referred to as being "coupled" or "connected" to another element, it can be directly coupled or connected to the other element or intervening elements may be present therebetween. In contrast, it will be understood that when an element is referred to as being "directly coupled" or "directly connected" to another element, there are no intervening elements present.

FIG. 1 is a view for describing a cooking appliance control system using artificial intelligence according to some embodiments of the present disclosure.

Referring to FIG. 1, a cooking appliance control system 1 includes a cooking appliance 300, a user equipment 100 for controlling the cooking appliance 300, and a server 200 which performs vision recognition of an image of a product to be cooked and retrieves a recipe. FIG. 1 shows a configuration in which the user equipment 100, the server 200, and the cooking appliance 300 are connected through a network 500.

Examples of the user equipment 100 may include a mobile phone, a smart phone, a tablet PC, an Ultrabook, a wearable device (for example, a watch-type artificial intelligence device (smartwatch), a glass-type artificial intelligence device (smart glass), a head mounted display (HMD)), and the like, which are capable of capturing the product to be cooked and of obtaining images of the product.

The user equipment 100 will be described later in detail with reference to FIG. 2.

The server 200 may function to provide various services related to an artificial intelligence model to the user equipment 100 in connection with the artificial intelligence model described in the embodiment of the present disclosure. Also, the server 200 may provide various services related to the vision recognition for obtaining information on the product to be cooked.

The server 200 which performs a cooking appliance control method according to some embodiments of the present disclosure may use artificial intelligence (AI) for the vision recognition of the captured image of the product to be cooked, and generation of a cooking command, etc.

Artificial intelligence refers to a field of studying artificial intelligence or methodology for making artificial intelligence, and machine learning refers to a field of defining various issues dealt with in the field of artificial intelligence and studying methodology for solving the various issues. The machine learning is defined as an algorithm that enhances the performance of a certain task through steady experience with the certain task.

An artificial neural network (ANN) is a model used in machine learning and may mean all of the models which have a problem-solving ability and are composed of artificial neurons (nodes) that form a network by synaptic connections. The artificial neural network may be defined by a connection pattern between neurons of different layers, a learning process for updating model parameters, and an activation function for generating an output value.

The artificial neural network may include an input layer, an output layer, and optionally one or more hidden layers. Each layer may include one or more neurons, and the artificial neural network may include a synapse that links neurons to neurons. Each neuron in the artificial neural network may output a function value of an activation function for input signals input through a synapse, a weight, and a bias.

The model parameter means a parameter determined by learning, and includes the weight of the synaptic connection and bias of neurons, etc. In addition, a hyper parameter means a parameter to be set before learning in the machine learning algorithm, and includes a learning rate, the number of times of the repetition, a mini batch size, an initialization function, and the like.

The purpose of the learning of the artificial neural network is regarded as determining a model parameter that minimizes a loss function. The loss function may be used as an index for determining an optimal model parameter in the learning process of the artificial neural network.

The machine learning may be classified into supervised learning, unsupervised learning, and reinforcement learning on the basis of a learning method.

The supervised learning may refer to a method of training the artificial neural network in a state in which a label for learning data is given. The label may mean a correct answer (or a result value) that the artificial neural network must infer when the learning data is input to the artificial neural network. The unsupervised learning may refer to a method of training the artificial neural network in a state in which a label for learning data is not given. The reinforcement learning may refer to a learning method of training an agent defined in a certain environment to select a behavior or a behavior sequence that maximizes the cumulative reward in each state.

Machine learning, which is implemented by a deep neural network (DNN) including a plurality of hidden layers of the artificial neural networks, is called deep learning, and the deep learning is a part of the machine learning. Hereinafter, the machine learning is used as a meaning including the deep running.

Also, the user equipment 100 which performs the cooking appliance control method according to some embodiments of the present disclosure may also utilize the above-described artificial intelligence.

The cooking appliance 300 is a type of an embedded system, receives a cooking command from the user equipment 100 through a wireless communication function, and performs cooking using cooking ingredients accordingly. The range of the cooking appliance 300 may include appliances such as an electric oven, a microwave oven, a cooktop, etc.

The network 500 may be a wired network and a wireless network, such as a local area network (LAN), a wide area network (WAN), Internet, intranet and extranet, and a mobile network, for example, a cellular network, 3G network, LTE network, 5G network, Wi-Fi network, ad hoc network, and any suitable communication network including a combination thereof.

The network 500 may include connection of network elements, such as a hub, a bridge, a router, a switch, and a gateway. The network 500 may include one or more connected networks, for example, a multi-network environment, including a public network, such as the Internet, and a private network, such as a secure private network of a corporation. Access to the network 500 may be provided over one or more wired or wireless access networks.

The user equipment 100 may transmit and receive data to the server 200, which is a learning device, over a 5G network. The user equipment 100 may perform data communication with the server 200 over the 5G network by using at least one service among an enhanced mobile broadband (eMBB), an ultra-reliable and low latency communication (URLLC), and a massive machine-type communication (mMTC).

The enhanced mobile broadband (eMBB) is a mobile broadband service through which multimedia contents, wireless data access, and the like are provided. In addition, more enhanced mobile services such as hot spot, broadband coverage, and the like for handling explosively increasing mobile traffic may be provided through the eMBB. Through the hot spot, a large amount of traffic is handled in an area with low user mobility and high density. Through the broadband coverage, a wide and stable wireless environment and user mobility may be guaranteed.

The ultra-reliable and low latency communication (URLLC) service defines much stricter requirements than the existing LTE in terms of reliability of data transmission and reception and transmission delay. The URLLC service corresponds to a 5G service for production process automation in industrial sites, telemedicine, telesurgery, transportation, security, and the like.

The massive machine-type communication (mMTC) is a service that requires transmission of a relatively small amount of data and is not sensitive to transmission delay. Much more terminals, such as sensors, and the like, than general mobile phones may access a wireless access network simultaneously by the mMTC. In this case, costs of the communication modules of the terminals need to be cheap, and improved power efficiency or power saving technology are required so that the terminals may operate for years without battery replacement and recharging.

Figure 2:
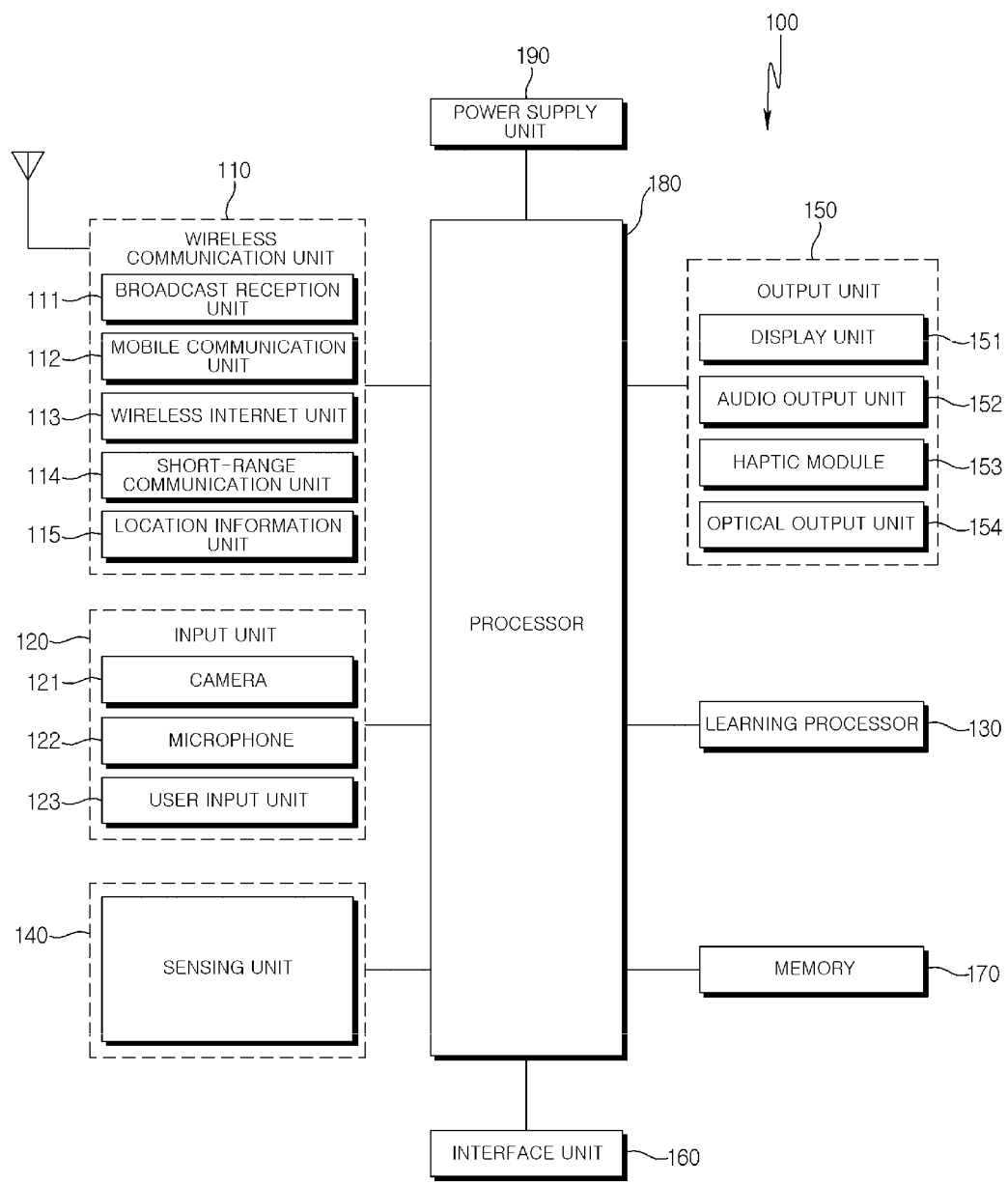
FIG. 2 is a view for describing a user equipment included in the cooking appliance control system according to some embodiments of the present disclosure.

FIG. 2 is a view for describing the user equipment 100 capable of performing the cooking appliance control method using artificial intelligence according to some embodiments of the present disclosure.

Referring to FIG. 2, the user equipment 100 may include the user equipment 100 may include a wireless communication unit 110, an input unit 120, a learning processor 130, a sensing unit 140, and an output unit 150, an interface unit 160, a memory 170, a processor 180, and a power supply unit 190.

The user equipment 100 according to the embodiment of the present disclosure invention may perform a function of a control terminal which controls the cooking appliance 300. The cooking appliance 300 may receive the cooking command through the user equipment 100 and provide a message indicating a cooking completion result to the user equipment 100.

Specifically, a wireless communication unit 110 may include at least one among a broadcast reception unit 111, a mobile communication unit 112, a wireless internet unit 113, a short-range communication unit 114, and a location information unit 115.

The broadcast reception unit 111 may receive a broadcast signal and/or broadcast-related information from an external broadcast management server through a broadcast channel.

The mobile communication unit 112 may transmit and receive a wireless signal from at least one among a base station, an external terminal, and a server over a mobile communication network that are established according to technical standards or communications methods for mobile communication (for example, The Global System for Mobile communication (GSM), code-division multiple access (CDMA), code-division multiple access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and the like). However, the present disclosure is not limited to the above-described examples of the communication methods.

The wireless internet unit 113 is a module for wireless internet access, and may be built in or externally attached to the user equipment 100. The wireless internet unit 113 may be configured to transmit and receive wireless signals over a communication network according to wireless internet technologies.

Examples of the wireless Internet technologies include a wireless LAN (WLAN), Wi-Fi, Wi-Fi Direct, Digital Living Network Alliance (DLNA), wireless broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like. However, the present disclosure is not limited to the above-described examples of the wireless Internet technical standards.

In the cooking appliance control system according to some embodiments of the present disclosure, the image of the product to be cooked that the user equipment 100 has obtained by using a camera 121 may be transmitted to the server 200 through network 500 connected by using the mobile communication unit 112 or the wireless internet unit 113.

The short-range communication unit 114 is for short-range communication, and may support short-range communication by using at least one among Bluetooth™, radio-frequency identification (RFID), Infrared Data Association (IrDA), ultra-wideband (UWB), ZigBee, near-field communication (NFC), Wi-Fi, Wi-Fi Direct, Wireless Universal Serial Bus (Wireless USB) technologies. However, the present disclosure is not limited to the above-described examples of the short-range communication methods.

The location information unit 115 is a module for obtaining the location (or current location) of the user equipment 100, and representative examples of the location information unit include a Global Positioning System (GPS) module or a Wi-Fi module. For example, by using the GPS module, the user equipment 100 may obtain the location of the user equipment 100 by using a signal transmitted from a GPS satellite.

The input unit 120 may include the camera 121 for inputting an image signal, a microphone 122 for receiving an audio signal, and a user input unit 123 for receiving information from a user.

Audio data or image data collected by the input unit 120 may be analyzed by the processor 180 to be processed as a user's control command.

The input unit 120 is for input of video information (or signal), audio information (or signal), data, or information input from the user. For input of the video information, the user equipment 100 may include one or multiple cameras 121.

The camera 121 processes image frames such as still images, video, or the like obtained by an image sensor in a video call mode or a shooting mode. The processed image frame may be displayed on a display unit 151 or stored in the memory 170.

In the cooking appliance control system according to some embodiments of the present disclosure, the user equipment 100 captures the product to be cooked, by using the camera 121, thereby obtaining the image of the product to be cooked. The image of the product to be cooked as an object to be captured may be the packaging of the product to be cooked, the logo of the product to be cooked, the contents of the product to be cooked, or a barcode of the product to be cooked. However, the present invention is not limited thereto.

The microphone 122 processes external sound signals into electrical audio data. The user terminal 100 may receive a user's speech command through the microphone 122.

The processed audio data may be used in various ways depending on the function being performed (or an application program in execution) by the user equipment 100. In the meantime, in the microphone 122, various noise-removal algorithms for removing noise that occurs in the process of receiving an external sound signal may be implemented.

The user input unit 123 is for receiving information from a user. When information is input through the user input unit 123, the processor 180 controls the operation of the user equipment 100 according to the input information. The user input unit 123 may include a touch input means and a mechanical input means (or a mechanical key, for example, a button, a dome switch, a jog wheel, a jog switch, etc. positioned on the front/rear or the side of the mobile equipment 100).

For example, the touch input means may include a virtual key, a soft key, or a visual key displayed on the display unit 151 through software processing, or may include a touch key placed on a portion other than the display unit 151. In the meantime, the virtual key or visual key may have various forms and may be displayed on a touch screen. For example, the virtual key or visual key may be formed of a graphic, text, icon, video, or a combination thereof.

The learning processor 130 may be configured to perform data mining, data analysis, intelligent decision making, and a machine learning algorithm, and to receive, classify, store, and output information to be used for the technologies.

The learning processor 130 may include one or more memory units configured to store data received, detected, sensed, generated, predefined, or in another way output by the user equipment 100 using artificial intelligence or data received, detected, detected, generated, predefined, or in another way output by another component, device, user equipment 100 or a device in communication with the user equipment 100.

The learning processor 130 may include a memory integrated with or implemented in the user equipment 100. In some embodiments, the learning processor 130 may be implemented by using the memory 170.

Optionally or additionally, the learning processor 130 may be implemented by using a memory related to the user equipment 100, for example, an external memory coupled directly to the user equipment 100 or a memory maintained in a server communicating with the user equipment 100.

In another embodiment, the learning processor 130 may be implemented by using a memory maintained in a cloud computing environment or by using another remote memory location accessible by the user equipment 100 through a communication method such as a network.

The learning processor 130 may be generally configured such that data is stored in one or more databases in order that the data is identified, indexed, categorized, manipulated, stored, retrieved and output for the purpose that data is used in supervised learning, unsupervised learning, data mining, predictive analytics or in other machines.

Through use of any of a variety of different types of data analysis algorithms and machine learning algorithms, the information stored in the learning processor 130 may be used by one or more other controllers of the cooking appliance or the processor 180.

Examples of such algorithms include k-nearest neighbor system, fuzzy logic (e.g., probability theory), neural network, Boltzmann machine, vector quantization, pulse neural network, support vector machine, maximum margin classifier, hill climbing, inductive logic system Bayesian network, Petri Net (e.g., finite state machine, Mealy machine, Moore finite state machine), classifier tree (e.g., perceptron tree, support vector tree, Markov tree, decision tree forest, random forest), stake model and system, artificial fusion, sensor fusion, image fusion, reinforcement learning, augmented reality, pattern recognition, automated planning, and the like.

The processor 180 may control the operation of the user equipment 100 to correspond to the input information.

The processor 180 may determine or predict at least one executable operation of the user equipment on the basis of information that is determined or generated by using the data analysis and machine learning algorithm. To this end, the processor 180 may request, search, receive, or utilize the data of the learning processor 130 and may control the user equipment such that operations which are predicted or are determined to be desirable among the at least one executable operation are performed.

The processor 180 may perform various functions for implementing intelligent emulation (i.e., a knowledge-based system, an inference system, and a knowledge acquisition system). The processor may be applied to various types of systems (e.g., fuzzy logic systems), including adaptive systems, machine learning systems, artificial neural networks, and the like.

The processor 180 may also include sub-modules that enable operations involving audio and natural language voice processing, such as an I/O processing module, an environmental condition module, a speech-to-text (STT) processing module, a natural language processing (NLP) module, a workflow processing module, and a service processing module.

Each of these submodules may have access to one or more systems, or data and model, or a subset or super set thereof, in an audio recognition device. In addition, each of these submodules may provide various functions, including lexical index, user data, workflow model, service model, and automatic speech recognition (ASR) system.

According to another embodiment, other aspects of the processor 180 or the user equipment 100 may be implemented with the submodule, system, or data and model.

According to some embodiments, based on data of the learning processor 130, the processor 180 may be configured to detect requirements on the basis of a user's intention or a contextual condition expressed in user input or natural language input.

The processor 180 may actively derive and obtain the information required to fully determine the requirements on the basis of the contextual condition or the user's intention. For example, the processor 180 may actively derive the information required to determine the requirements by analyzing historical data, including historical input and output, pattern matching, unambiguous words, input intent, and the like.

The processor 180 may determine a flow of tasks for executing a function in response to the requirement on the basis of the contextual condition or the user's intention.

The processor 180 collects, detects, extracts, and/or receives signals or data used for data analysis and machine learning tasks through one or more sensing components in the user equipment to collect information for processing and storage in the learning processor 130.

The information collection may include sensing information via a sensor, extracting information stored in memory 170, receiving information from another artificial intelligence device, entity, or external storage device via a communication means, and so on.

The processor 180 may collect and store use history information of the user equipment of the present disclosure. The processor 180 can use the stored use history information and predictive modeling to determine the best match in which a particular function is executed.

The processor 180 may receive or detect surrounding environment information or other information through the sensing unit 140.

The processor 180 may receive a broadcast signal and/or broadcast related information, a wireless signal, and wireless data through the wireless communication unit 110.

The processor 180 may receive image information (or a corresponding signal), audio information (or a corresponding signal), data, or user input information from the input unit 120.

The processor 180 collects information in real time, processes or classifies the information (e.g., knowledge graph, command policy, personalization database, conversation engine, etc.), and stores the processed information in the memory 170 or the learning processor 130.

When the operation of the user equipment 100 is determined on the basis of data analysis and machine learning algorithms and techniques, the processor 180 may control components of the user equipment 100 to perform the determined operation. The processor 180 may control the equipment according to the control command, thereby performing the determined operation.

When a specific operation is executed, the processor 180 analyzes historical information indicating execution of the specific operation through data analysis and machine learning algorithms and techniques, and updates the previously learned information on the basis of the analyzed information.

Accordingly, the processor 180 may improve accuracy of future performance of data analysis and machine learning algorithms and techniques on the basis of the updated information, together with the learning processor 130.

The sensing unit 140 may include one or more sensors for sensing at least one of information in the user equipment 100, surrounding environment information surrounding the user equipment 100, and user information.

For example, the sensing unit 140 may include at least one of a proximity sensor 141, an illumination sensor 142, a touch sensor, an acceleration sensor, a magnetic sensor, a gravity sensor, a gyroscope sensor, motion sensor, RGB sensor, infrared sensor (IR sensor), fingerprint scan sensor, ultrasonic sensor, optical sensor (e.g., camera, see 121), microphones (e.g., see 122), battery gauges, environmental sensors (e.g. barometers, hygrometers, thermometers, radiation sensors, heat sensors, gas sensors, etc.), chemical sensors (e.g. an electronic nose, a healthcare sensor, a biometric sensor, etc.). Meanwhile, the user equipment 100 disclosed in the present disclosure may use a combination of information detected by at least two or more of these sensors.

The output unit 150 is used to generate outputs related to visual, auditory, or tactile senses, and includes at least one of the display unit 151, an audio output unit 152, a haptic module 153, and an optical output unit 154.

The display unit 151 displays (outputs) information processed by the user equipment 100. For example, the display unit 151 may display execution screen information of an application program operated in the user equipment 100, or user interface (UI) and graphic user interface (GUI) information according to the execution screen information.

The display unit 151 is structured in a manner as to have a layer structure with a touch sensor or be integrally formed with a touch sensor, thereby implementing a touch screen. The touch screen may function as a user input unit 123 providing an input interface between the user equipment 100 and the user, while providing an output interface between the user equipment 100 and the user.

In particular, the display unit 151 according to some embodiments of the present disclosure may perform a function that the user equipment 100 receives an input of the user in order to perform the cooking appliance control method. That is, while instructing the cooking appliance 300 to operate, the user may modify the cooking command or input storage environment information of the product to be cooked, through the input interface regarding the details of the cooking command displayed through the display unit 151, while instructing the cooking appliance 300 to operate.

The audio output unit 152 may output audio data received from the wireless communication unit 110 or stored in the memory 170 in a call signal reception mode, a call mode, a recording mode, a voice recognition mode, a broadcast reception mode, and the like. The audio output unit 152 may include at least one of a receiver, a speaker, and a buzzer.

The haptic module 153 generates various tactile effects that a user can feel. A representative example of the tactile effect generated by the haptic module 153 may include vibration.

The optical output unit 154 outputs a signal for notifying event occurrence by using light from a light source of the user equipment 100. Examples of events occurring in the user equipment 100 may include message reception, call signal reception, a missed call, an alarm, a schedule notification, email reception, information reception through an application, and the like.

The interface unit 160 serves as a path to various types of external devices connected to the user equipment 100. The interface unit 160 may include at least one of a wired/wireless headset port, an external charger port, a wired/wireless data port, a memory card port, port connecting a device equipped with an identification module, an audio input/output (I/O) port, a video input/output (I/O) port, and an earphone port. In response to the connection of the external device to the interface unit 160, the user equipment 100 may perform appropriate control related to the connected external device.

Meanwhile, the identification module is a chip that stores a variety of information for authenticating the use rights of the user equipment 100, and includes a user identification module (UIM), subscriber identity module (SIM), universal subscriber identity module (USIM), and the like. The device equipped with the identification module (hereinafter referred to as an "identification device") may be manufactured in the form of a smart card. Therefore, the identification device may be connected to the user equipment 100 through the interface unit 160.

The memory 170 stores data supporting various functions of the user equipment 100.

The memory 170 may store multiple application programs or applications that are driven in the user equipment 100, data used for operating the user equipment 100, instructions, and data used for operation of the learning processor 130 (e.g., at least one algorithm information for machine learning, etc.).

The processor 180 typically controls the overall operation of the user equipment 100 in addition to the operations associated with the application program. The processor 180 may process signals, data, information, or the like input or output through the above-described components or operate the application program stored in the memory 170, thereby providing or processing information or functions that are suitable for the user.

In addition, the processor 180 may control at least some of the components described with reference to FIG. 1 to operate the application program stored in the memory 170. In addition, the processor 180 may operate a combination of at least two of the components included in the user equipment 100 in combination with each other to run the application program.

The power supply unit 190 may supply power to each component included in the user equipment 100 by receiving an external power source or an internal power source under the control of the processor 180.

The power supply unit 190 includes, for example, a battery, which may be a built-in battery or a replaceable battery. On the other hand, the power supply unit 190 may be an adaptor which receives an alternate current power and converts it into a direct current power, and then supplies to the user equipment 100.

In the meantime, as described above, the processor 180 typically controls the overall operation of the user equipment 100 in addition to the operations associated with the application program. For example, when the state of the user equipment 100 satisfies a set condition, the processor 180 may execute or release a locked state that restricts an input of a user's control command to the applications.

Figure 3:
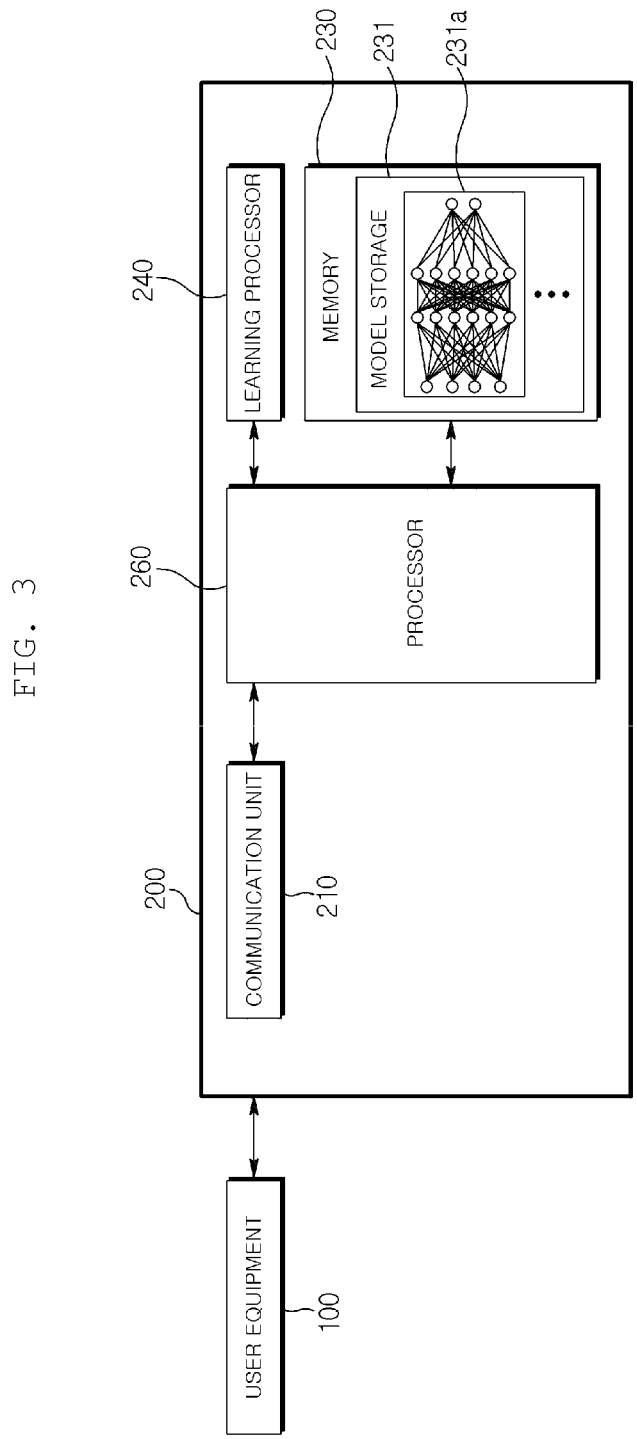
FIG. 3 is a view for describing a server included in the cooking appliance control system according to some embodiments of the present disclosure.

FIG. 3 is a view for describing the server 200 included in the cooking appliance control system according to some embodiments of the present disclosure.

Referring to FIG. 3, the server 200 may include a communication unit 210, an input unit 220, a memory 230, a learning processor 240, a storage 250, and a processor 260.

The communication unit 210 may correspond to a configuration including the wireless communication unit 110 and the interface unit 160 of FIG. 2. That is, the communication unit 210 may transmit/receive data to/from other devices through wired/wireless communication or an interface.

The input unit 220 corresponds to the input unit 120 of FIG. 2 and may obtain data by receiving data from the communication unit 210.

The input unit 220 may obtain a training data for model learning and obtain an input data, etc., for obtaining an output by using a trained model.

The input unit 220 may obtain raw input data. In this case, the processor 260 may pre-process the obtained data and thus may generate a training data that can be input to model learning or a pre-processed input data.

Here, the pre-processing of the input data performed by the input unit 220 may mean that an input feature is extracted from the input data.

The memory 230 corresponds to the memory 170 of FIG. 2. The memory 230 may include a model storage 231, a database 232, etc.

The memory 230 may temporarily store data processed by the processor 260.

The model storage 231 stores a model (or an artificial neural network 231*a*) which is being trained or has been trained through the learning processor 240. When the model is updated through learning, the model storage 231 stores the updated model.

Here, if necessary, the model storage 231 may store the trained models with the division of the trained models into a plurality of versions according to the learning time point or the degree of learning progress.

The artificial neural network 231*a* shown in FIG. 3 is just an example of an artificial neural network including a plurality of hidden layers. The artificial neural network of the present disclosure is not limited to this.

The artificial neural network 231*a* may be implemented with hardware, software or a combination of hardware and software. When the artificial neural network 231*a* is partially or wholly implemented in software, one or more instructions constituting the artificial neural network 231*a* may be stored in the memory 230.

The database 232 may store the input data obtained by the input unit 220, the learning data (or training data) used for the model learning, the learning history of the model, etc.

The input data stored in the database 232 may be not only processed data suitable for the model learning but also a raw input data itself.

The server 200 included in the cooking appliance control system according to some embodiments of the present disclosure may store, in the database 232, user account information and recipe data for cooking the product to be cooked. The recipe data and user account information will be described in more detail later with reference to FIG. 7.

The learning processor 240 corresponds to the learning processor 130 of FIG. 2. The learning processor 240 may train the artificial neural network 231*a* by using the training data or a training set.

The learning processor 240 trains the artificial neural network 231*a* by obtaining immediately data obtained by the processor 260 which has pre-processed the input data obtained through the input unit 220, or trains the artificial neural network 231*a* by obtaining the pre-processed input data stored in the database 232.

Specifically, the learning processor 240 trains repeatedly the artificial neural network 231*a* by using the above-described various learning methods, thereby determining optimized model parameters of the artificial neural network 231*a*.

In this specification, the artificial neural network which is trained by using the training data and has hereby a determined parameter may be referred to as a learning model or a trained model.

Here, the learning model may infer a result value in the state of being mounted on the server 200 of the artificial neural network, or may be transmitted to another device such as the user equipment 100 through the communication unit 210 and mounted.

Also, when the learning model is updated, the updated learning model may be transmitted to another device such as a user equipment 101 through the communication unit 210 and mounted.

The storage 250 may store programs and data required for the operation of the server 200. The storage 250 may store, for example, program data which performs the vision recognition of the product to be cooked and may provide the program data to the memory 230 when the corresponding program is executed by the processor 260.

Also, the storage 250 may store data related to the user account and information on the cooking appliances classified by users. As will be described later, the server 200 may load the information on the cooking appliance registered in the user account. Here, the processor 260 may load the information on the cooking appliance registered in the user account from the storage 250, and may provide the information to the memory 230.

The storage 250 may store a user account database and a recipe database. The user account database and the recipe database stored in the storage 250 may be described in more detail with reference to FIG. 7.

In addition, the server 200 may evaluate the artificial intelligence model, may update the artificial intelligence model for better performance even after the evaluation, and may provide the updated artificial intelligence model to the user equipment 100. Here, the user equipment 100 may perform alone in a local area a series of steps performed by the server 200 or perform together with the cloud server 200 through the communication with the server 200.

For example, the user equipment 100 may update the artificial intelligence model downloaded from the server 200 by allowing the artificial intelligence model to learn a personal pattern of the user through the learning of the user's personal data.

Figure 4:
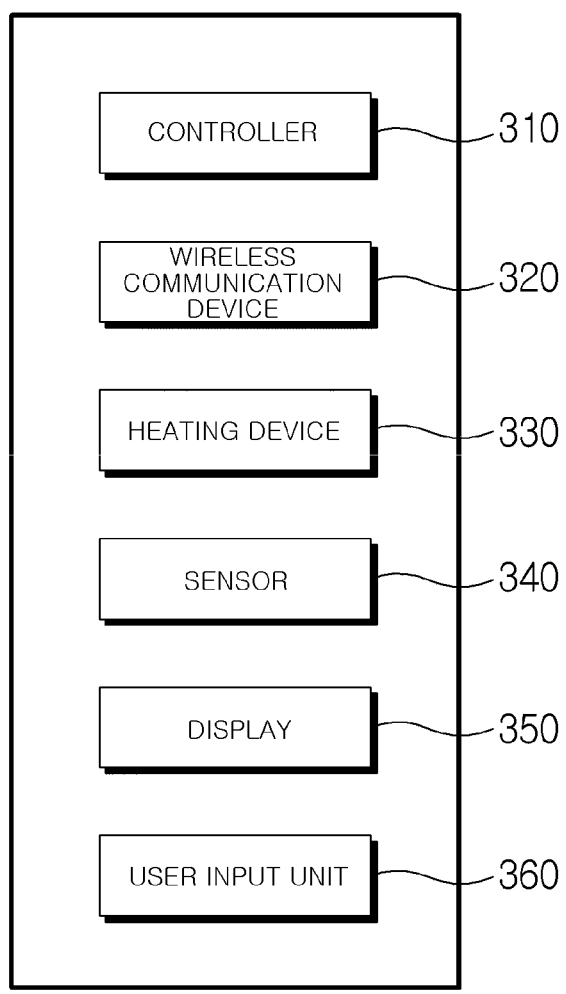
FIG. 4 is a view for describing a cooking appliance which is controlled by a cooking appliance control method according to some embodiments of the present disclosure.

FIG. 4 is a view for describing the cooking appliance 300 which is controlled by the cooking appliance control method according to some embodiments of the present disclosure.

Referring to FIG. 4, the cooking appliance 300 controlled by the cooking appliance control method according to some embodiments of the present disclosure may include a controller 310, a wireless communication device 320, a heating device 330, and a sensor 340.

The controller 310 may control the operation of the cooking appliance 300. Specifically, when a control command of the cooking appliance 300 is provided through the wireless communication device 320 connected to the user equipment 100, the controller 310 may control the operation of the cooking appliance 300 on the basis of the corresponding cooking command.

The wireless communication device 320 may connect the cooking appliance 300 to the network 500, so that the cooking appliance 300 can be connected to the user equipment 100 or the server 200. The cooking appliance 300 connected to the user equipment 100 or the server 200 may receive a control command required to drive the cooking appliance 300 through the wireless communication device 320. In addition, when the cooking of the product to be cooked is completed, the cooking appliance 300 may transmit a completion message to the user equipment 100 or the server 200.

The wireless communication device 320 may use wireless internet standards, for example, a wireless LAN (WLAN), a wireless-fidelity (Wi-Fi), a wireless fidelity (Wi-Fi) direct, a digital living network alliance (DLNA), a wireless broadband (WiBro), and a WiMAX (World) Wireless Internet standards such as Interoperability for Microwave Access (HSDPA), High Speed Downlink Packet Access (HSDPA), High Speed Uplink Packet Access (HSUPA), Long Term Evolution (LTE), and Long Term Evolution-Advanced (LTE-A), and the like. However, the present disclosure is not limited by the examples of wireless Internet technical specifications described above.

The heating device 330 may provide heat for cooking the food to be cooked to the inside or the outside of the cooking appliance 300. In some embodiments of the present disclosure, when the cooking appliance 300 is an oven, the heating device 330 may include a convection heater, a convection fan that circulates high-temperature air including heat of the convection heater to the inside of a kitchen, and a convection motor which drives the convection fan. The heating device 330 is not limited to such a convection device. For example, an electric heater such as a halogen heater, a quartz heater, and a sheath heater, or a gas heater using gas may be used as the heating device 330.

Alternatively, when the cooking appliance 300 is a microwave oven, the heating device 330 may include a magnetron for generating electromagnetic waves and a heater.

Alternatively, when the cooking appliance 300 is a cooktop, the heating device 330 may include an induction heating module which generates an eddy current by sending current to a magnetic coil and heats a cooking vessel itself, thereby making it possible to cook food. Also, the heating device may include a radiant heating module which generates radiant heat by heating a heating coil, thereby making it possible to cook food.

The sensor 340 may include a temperature sensor, etc., which measures the internal temperature of the cooking appliance 300. For example, when the sensor 340 is the temperature sensor, the sensor 340 may measure the internal or external temperature of the cooking appliance 300 and transmit the temperature to the controller 310, and the controller 310 may control the output of the heating device 330 in response to the temperature measured by the sensor 340.

The display 350 may display a cooking process by the cooking appliance 300. Also, the display 350 may display the details of the control command provided from the user equipment 100.

The user input unit 360 may receive various parameter settings required to operate the cooking appliance 300. For example, the user may set cooking commands and details of the cooking commands directly through the user input unit 360 of the cooking appliance 300 without through the user equipment 100 according to the embodiment of the present disclosure.

Figure 5:
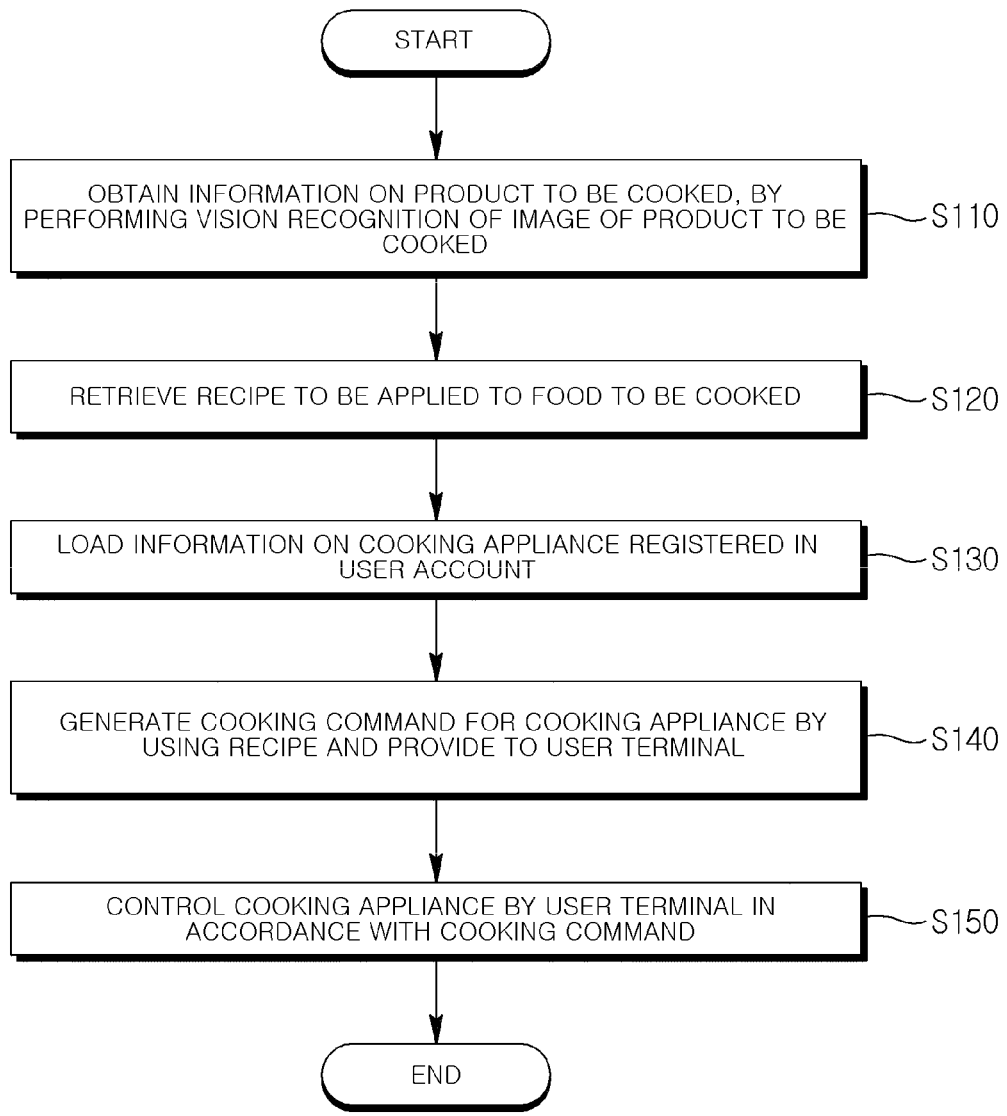
FIG. 5 is a flowchart for describing the cooking appliance control method according to some embodiments of the present disclosure.

FIG. 5 is a flowchart for describing the cooking appliance control method according to some embodiments of the present disclosure.

As will be described in more detail below, the cooking appliance control method according to some embodiments of the present disclosure may be performed by the user equipment 100 and the server 200. For example, each step of the cooking appliance control method may be performed by the processor 180 of the user equipment 100 and the processor 260 of the server 200.

Referring to FIG. 5, the cooking appliance control method according to some embodiments of the present disclosure includes obtaining the information on the product to be cooked, by performing the vision recognition of the image of the product to be cooked (S110).

The user equipment 100 may obtain the image of the product to be cooked. Specifically, the camera 121 may obtain the image of the product to be cooked, by capturing the product to be cooked. The "image" captured by the camera 121 may include, for example, the packaging of the product to be cooked, the logo of the product to be cooked, the contents of the product to be cooked, or an image of a barcode printed on the packaging of the product to be cooked. However, the present invention is not limited thereto.

In addition, two or more of the above three images of the product to be cooked obtained by the camera 121 may be selected and used for the vision recognition.

The processor 180 may perform image processing on the image captured by the camera 121, and then perform pre-processing required for the vision recognition to be performed. Alternatively, this pre-processing process may be performed by an image processor provided in the camera 121.

For the vision recognition, the image of the product to be cooked obtained by the user equipment 100 may be transmitted to the server 200.

The server 200 may obtain the information on the product to be cooked, by performing the vision recognition of the image of the product to be cooked. Specifically, the processor 260 may perform the vision recognition of the image of the product to be cooked provided through the communication unit 210.

Meanwhile, the learning processor 240 may train the artificial neural network 231*a* by using the result obtained by that the processor 260 performs the vision recognition of the image of the product to be cooked.

The server 200 may be configured to perform a step of removing noise from the image for the purpose of the vision recognition of the image of the product to be cooked, and of training the artificial intelligence model by using the image having no noise as learning data, and a step of recognizing an object, that is, the product to be cooked, by using the artificial intelligence model which has completed the learning through evaluation.

The removing noise corresponds to the data mining step for improving learning effect of the artificial intelligence model. As described above, the removing noise may include converting an RGB mode of the image into a gray mode, and optimizing the image and extracting a contour which use extracting a contour image by using Morph Gradient algorithm, removing noise by using Adaptive Threshold algorithm, and Morph Close and Long Line Remove algorithm. However, the above algorithms for removing noise are only examples, and the present invention is not limited thereto.

As described above, the recognition of the product to be cooked may be largely divided into three types. That is, the server 200 may obtain the information on the product to be cooked, by performing the vision recognition of the product itself to be cooked, by performing the vision recognition of the packaging of the product to be cooked, or by performing the vision recognition of a barcode printed on the packaging of the product to be cooked. In some embodiments of the present disclosure, the server 200 may simultaneously perform two or more of the three types of the vision recognitions.

Next, the server 200 retrieves a recipe to be applied to the food to be cooked (S120).

A database of recipe to be applied to the food to be cooked may be stored in the storage 250 of the server 200. The processor 260 of the server 200 may retrieve a recipe to be applied to the food to be cooked, from the recipe database stored in the storage 250. An example of the recipe database stored in storage 250 is shown in FIG. 6.

Figure 6:
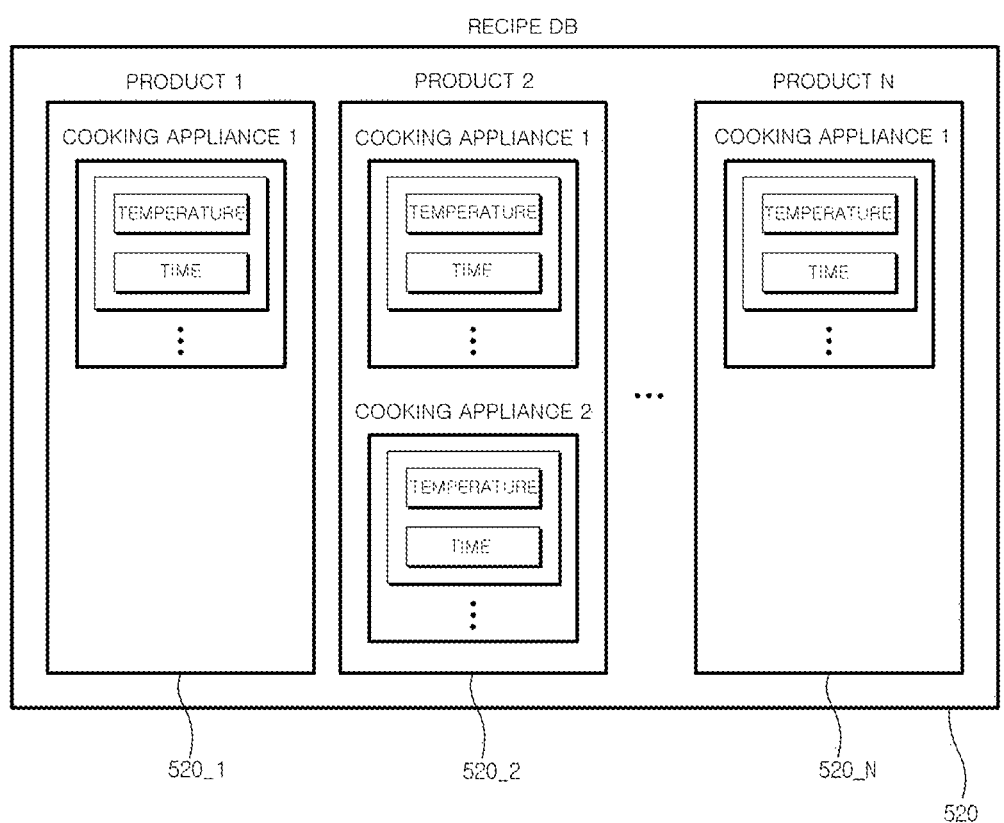
FIG. 6 is a view for illustratively describing a configuration of a recipe database which is stored in the server included in the cooking appliance control system according to some embodiments of the present disclosure.

FIG. 6 is a view for illustratively describing a configuration of the recipe database which is stored in the server included in the cooking appliance control system according to some embodiments of the present disclosure.

Referring to FIG. 6, a recipe database 520 may store a recipe used to generate the cooking command that the cooking appliance performs in order to cook the product to be cooked. The recipe database 520 of FIG. 6 is exemplarily shown as storing recipes 520_1 to 520_N of a product 1 to a product N.

Each recipe may include parameters such as heating temperature and time of a cooking operation performed by the cooking appliance 300.

The recipe 520_1 for the product 1 includes operation parameters for generating the cooking command performed by the cooking appliance 1. For example, the recipe 520_1 may include a cooking process in which "an oven cooks the product to be cooked at 140 degrees Celsius for five minutes".

Meanwhile, cooking commands of a plurality of cooking appliances may be performed for the same product. For example, in the case of the recipe 520_2 applied to the product 2, both a recipe for generating the cooking command performed by the cooking appliance 1 and a recipe for generating the cooking command performed by the cooking appliance 2 may be stored. The recipe applied to the product to be cooked may require all of the cooking appliances stored in the recipe or may selectively require the cooking appliances.

For example, the recipe 520_2 applied to the product 2 includes the use of the cooking appliance 1 and the use of the cooking appliance 2. The recipe applied to product 2 may require both the cooking appliance 1 and the cooking appliance 2. In this case, the recipe may include a process in which the product 2 is cooked with cooking appliance 1 and then is cooked with the cooking appliance 2, or a process in which the product 2 is cooked with cooking appliance 2 and then is cooked with the cooking appliance 1.

Alternatively, the recipe applied to the product 2 may require only one of the cooking appliance 1 and the cooking appliance 2. In this case, the user may select a cooking appliance to be used among the cooking appliance 1 and the cooking appliance 2 to cook the product to be cooked.

In some embodiments, the server 200 may generate the cooking commands for both the cooking appliance 1 and the cooking appliance 2 from the recipe for the product 2 and may provide them to the user equipment 100, and the user equipment 100 may provide the cooking command selected by the user to the cooking appliance.

The server 200 may retrieve a recipe to be applied to the product to be cooked from the recipe database, by using the information of the product to be cooked obtained from the result of the vision recognition. The retrieved recipe may be temporarily stored in the memory 230 for the transmission to the user equipment 100.

Although it has been described above that the recipe database in which the recipe to be applied to the product to be cooked is stored is stored in the storage 250 of the server 200, the present invention is not limited thereto. The recipe database may be stored in another server connected to the server 200 through the network 500.

Referring back to FIG. 5, the server 200 loads information on the cooking appliance registered in the user account (S130).

The server 200 may access a user database including the user account and data related to the user account. The user database will be described in more detail with reference to FIG. 7.

Figure 7:
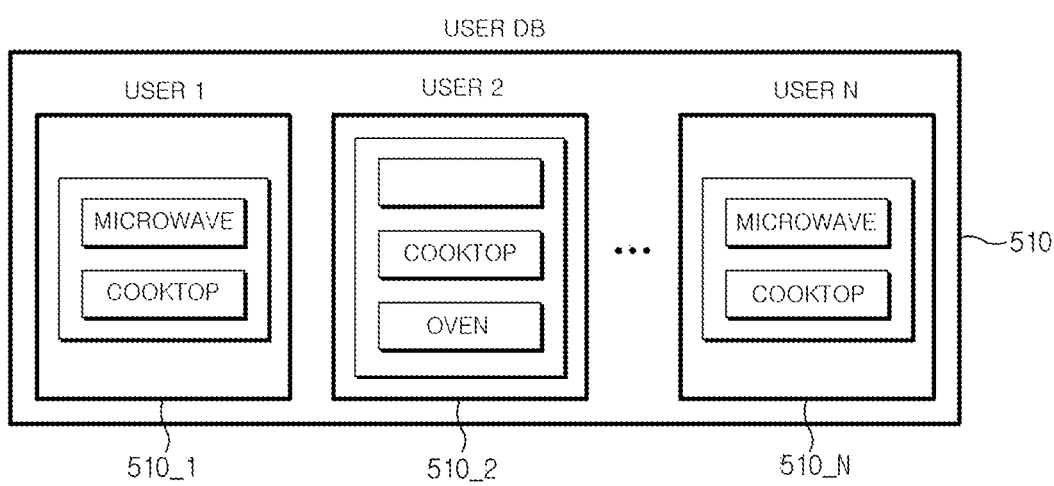
FIG. 7 is a view for illustratively describing a configuration of a user database which is stored in the server included in the cooking appliance control system according to some embodiments of the present disclosure.

FIG. 7 is a view for illustratively describing a configuration of the user database which is stored in the server included in the cooking appliance control system according to some embodiments of the present disclosure.

The user database 510 may be, for example, stored in the storage 250 of the server 200. However, the present invention is not limited thereto, and the user database 510 may be stored in another server connected to the server 200 through the network 500.

The user database 510 may include data related to the user account. Each user may own his/her user account on the server 200 and access data stored in the user account by logging into his/her account. The user database 510 of FIG. 7 is exemplarily shown as storing accounts 510_1 to 510_N of users 1 to N.

A list of cooking appliances registered in the user account by each user may be stored in the user account. FIG. 7 shows illustratively that information on microwave ovens and cooktops is registered in the account 510_1 of the user 1, and information on microwave ovens, cooktops, and ovens is registered in the account 510_2 of the user 2.

The cooking appliance registered in the user account means that it is owned by the user. That is, the registered cooking appliance means it can be controlled by the user equipment 100 receiving the cooking command from the server 200.

Before performing the cooking appliance control method according to the embodiment of the present disclosure, the user may register his/her cooking appliances in his/her user account.

The server 200 may access each of the user accounts 510_1 to 510_N and may load the information on the cooking appliance registered in the user account. The loaded information on the cooking appliance may be temporarily stored, for example, in the memory 230 of the server 200.

Next, the server 200 generates the cooking command for the cooking appliance by using the recipe and provides to the user terminal (S140).

The server 200 may generate the cooking command by using the recipe retrieved from the recipe database 520 and the cooking appliance information loaded from the user database 510.

For the cooking appliance registered in the user account of the user database 510, the cooking command including parameters such as a cooking temperature and a cooking time included in the retrieved recipe of the product to be cooked may be generated.

The server 200 may compare the cooking appliance information included in the recipe database 520 with the cooking appliance information registered in the user account.

For example, it is assumed that the recipe for a product 3 may generate the cooking command for the cooking appliance selected by the user from among the cooking appliance 1 (e.g., an oven) and the cooking appliance 2 (e.g., a microwave oven) and the cooking appliance 1 is not registered in the user account of the user 3 and the cooking appliance 2 is registered in the user account of the user 3. In this case, the server 200 may generate only the cooking command for the registered cooking appliance without generating the cooking command for the cooking appliance that is not registered in the user account from the recipe for the product 3.

Alternatively, it is assumed that both the cooking appliance 1 and the cooking appliance 2 are registered in the user account of the user 3. In this case, the server 200 may generate cooking commands for both the cooking appliances 1 and 2 from the recipe for the product 3.

The cooking appliance control method after the cooking command generated from the server 200 is provided to the user equipment 100 will be described with reference to FIG. 8.

Figure 8:
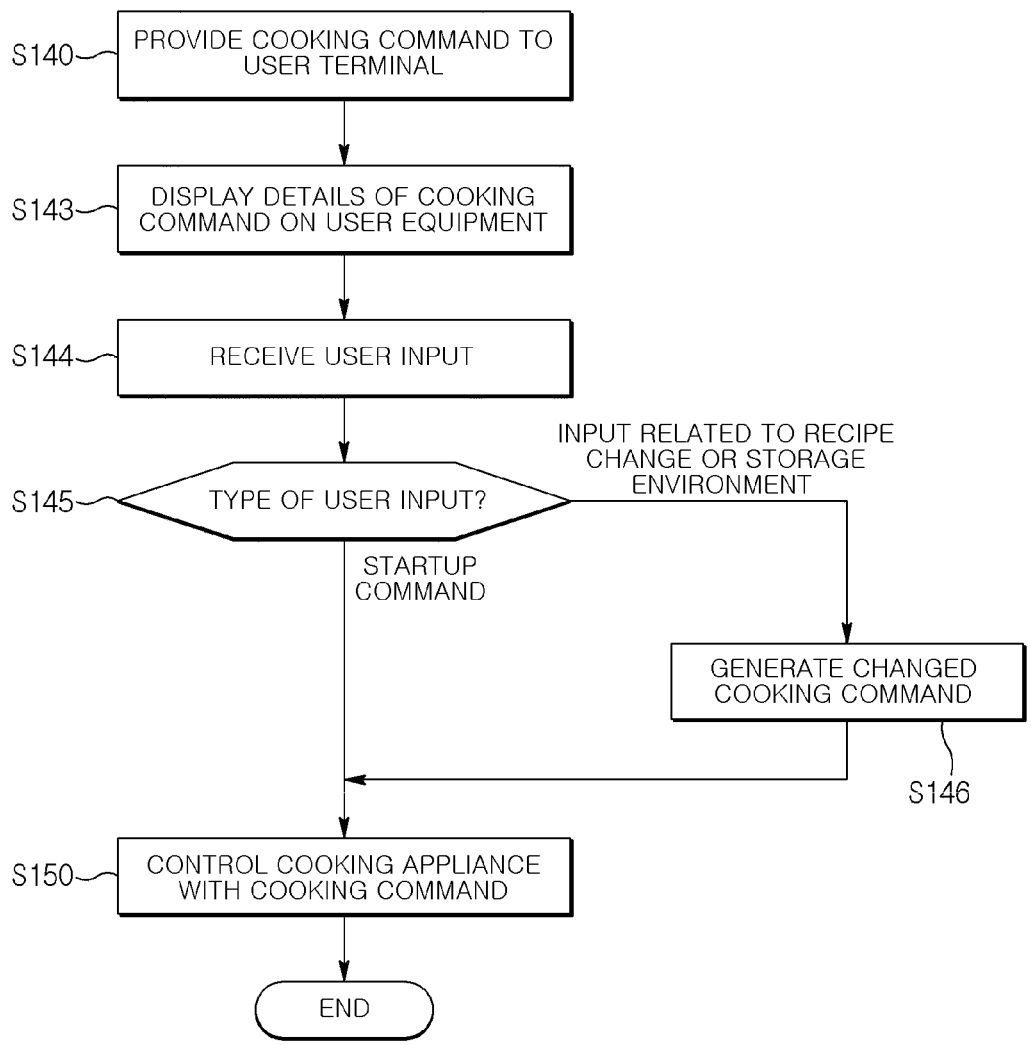
FIG. 8 is a flowchart for describing the cooking appliance control method according to some embodiments of the present disclosure.

FIG. 8 is a flowchart for describing the cooking appliance control method according to some embodiments of the present disclosure.

Referring to FIG. 8, after providing the cooking command to the user terminal (S140), the control method may include displaying details of the cooking command on the user equipment 100 (S143).

That is, the display unit 151 of the user equipment 100 may display the details of the cooking command for controlling the cooking appliance 300. The details of the cooking command may include, for example, the type of cooking appliance, allergy information of the product to be cooked, the type of accessory required to cook with the cooking appliance 300, and the number of the products to be cooked that the cooking appliance 300 cooks.

Subsequently, the user equipment 100 receives a user input (S144) and determines whether the type of the user input is related to a recipe change or a storage environment of the product to be cooked or is a startup command (S145).

When the input user input is related to a recipe change or a storage environment of the product to be cooked, the user equipment 100 generates the cooking command having changed details corresponding thereto (S146).

In some embodiments of the present disclosure, the user equipment 100 may receive the storage environment information of the product to be cooked as a user input. The storage environment information of the product to be cooked may refer to a temperature condition in which the product is stored, for example, whether the product is stored frozen, refrigerated, or stored at room temperature.

Alternatively, when the storage environment information of the product to be cooked is room temperature storage, the user equipment 100 may reduce the cooking time or the cooking temperature among the cooking commands.

In this way, the user equipment 100 may generate the cooking command having details changed based on the input storage environment information.

In some embodiments of the present disclosure, the user equipment 100 may receive modifications of the details of the cooking command from the user. Specifically, the user may modify, for example, the cooking time or the cooking temperature among the modifications of the cooking command displayed by the user equipment 100.

In this case, the user equipment 100 may generate the modified cooking command on the basis of the input provided by the user and provide it to the cooking appliance 300. That is to say, this corresponds to a case where the user inputs the modified cooking command to the user equipment 100 when the user desires to make the cooking degree of the product to be cooked different from the cooking command suggested by the server 200 or the user equipment 100.

The user equipment 100 may transmit the modified cooking command to the server 200.

In some embodiments, the server 200 may learn user's cooking characteristics on the basis of the modified cooking command. The server 200 may learn the modified cooking command and generate a user cooking characteristic learning model. For example, the server 200 may learn the user's cooking characteristics by using the artificial neural network 231*a*.

The generated user cooking characteristic learning model may be stored in the user database. When the server 200 generates the cooking command for the cooking appliance on the basis of the retrieved recipe, the server 200 may generate the cooking command reflecting the user cooking characteristic learning model. Through this, user experience with the cooking appliance 300 can be improved by controlling the cooking appliance 300 through the cooking command suitable for the user's cooking characteristics.

When the input user input is a startup command, the user equipment 100 controls the cooking appliance 300 with the cooking command (S150).

Referring back to FIG. 5, finally, the user terminal controls the cooking appliance in accordance with the cooking command (S150).

The server 200 may provide the generated cooking command to the user equipment 100. The user equipment 100 outputs details of the received cooking command through the display unit 151. When the user equipment 100 receives an input for starting the cooking operation from the user, the user equipment may control the operation of the cooking appliance 300 by providing the cooking command to the cooking appliance 300.

As a result, the cooking appliance control system according to the embodiment of the present disclosure may perform the vision recognition of the result obtained by capturing, with the user equipment 100, the product to be cooked, and may provide the cooking command corresponding to the product to be cooked to the cooking appliance 300. Through this, the user is able to automatically control the cooking appliance without having to read a cooking method printed on the packaging of the product to be cooked, etc. This can improve user experiences with the cooking appliance. In addition, since the operation of the cooking appliance 300 is performed by using the user-friendly and convenient user equipment 100 such as a display or a touch screen, the operation of the cooking command can be easier.

When the cooking of the food to be cooked by the cooking appliance 300 is completed, the cooking appliance 300 may notify the user equipment 100 of the completion of the cooking. The user equipment 100 may output a cooking completion image to the display unit 151 or may output sound to the audio output unit 152.

FIG. 9 is a view for describing contents displayed on the display unit of the user equipment which performs the cooking appliance control method according to some embodiments of the present disclosure.

Referring to FIG. 9, in (a), a captured image of the product to be cooked is displayed on the display unit 151. The user may use the user equipment 100 to capture the packaging of the product to be cooked, the logo of the product to be cooked, the contents of the product to be cooked, or an image of a barcode printed on the packaging of the product to be cooked.

In (b) of FIG. 9, an image content indicating that the vision recognition is being performed on the image of the product to be cooked captured by the user is displayed on the display unit 151. In some embodiments of the present disclosure, while the user equipment 100 displays the contents of (b) of FIG. 9 on the display unit 151, the vision recognition (S110), the recipe retrieval (S120), the loading of the cooking appliance (S130), and the provision of the cooking command (S140) may be all performed by the server 200.

In (c) of FIG. 9, it is exemplarily shown that the details of the cooking command provided from the server 200 are displayed on the user equipment 100. The details of the cooking command may include, for example, the type of cooking appliance, allergy information of the product to be cooked, the type of accessory required to cook with the cooking appliance 300, and the number of the products to be cooked that the cooking appliance 300 cooks The user equipment 100 may receive the storage environment information of the product to be cooked from the user. As shown in (c) of FIG. 9, the storage environment information of the product to be cooked is related to the temperature condition in which the product is stored. For example, the storage environment information may mean whether the product is stored frozen, refrigerated, or stored at room temperature.

FIG. 10 is a data flowchart for describing the cooking appliance control method according to some embodiments of the present disclosure.

Referring to FIG. 10, a data flow between the user equipment 100, the server 200, and the cooking appliance 300 is exemplarily shown.

The user equipment 100 obtains an image by capturing the product to be cooked (S101). The user equipment 100 transmits the image of the product to be cooked to the server 200 (S102).

The server 200 performs the vision recognition of the image of the product to be cooked and obtains the information on the product to be cooked (S110). The server 200 retrieves a recipe based on the information on the product to be cooked (S120). In addition, the server 200 loads the information on the cooking appliance registered in the user account (S130). The server 200 generates the cooking command by using the retrieved recipe and the information on the cooking appliance (S141), and transmits the generated cooking command to the user equipment 100 (S142).

The user terminal 100 displays, through the display unit 151, the details of the provided cooking command (S143). By the cooking start input of the user (S144), the user equipment 100 transmits the cooking command to the cooking appliance 300 (S151).

The cooking appliance 300 receiving the cooking command starts cooking (S152). When the cooking is completed (S153), the cooking appliance 300 provides cooking completion information to the user equipment 100 (S154). The user equipment 100 outputs the cooking completion to the display unit 151 or the audio output unit 152 (S155).

FIG. 11 is a flowchart for describing the cooking appliance control method according to some other embodiments of the present disclosure.

Referring to FIG. 11, the cooking appliance control method includes comparing the cooking appliance of the recipe with the cooking appliance information of the user account (S131) after loading the cooking appliance information registered in the user account (S130).

The server 200 determines whether the cooking appliance 300 required by the recipe retrieved in the recipe database 520 is included in the cooking appliance 300 registered in the user account of the user database 510 (S132).

When the cooking appliance 300 requested by the recipe is included in the cooking appliance registered in the user account, the server 200 generates the cooking command for each cooking appliance 300.

When the cooking appliance 300 requested by the recipe is not included in the cooking appliance registered in the user account, the server 200 may generate both the cooking command and the guide information for the cooking appliance 300.

For example, the cooking appliance 1 and the cooking appliance 2 required by the recipe is required to be sequentially used and only the cooking appliance 1 is registered in the user account, the server 200 may generate the guide information that can replace the cooking command for the cooking appliance 1 and the cooking appliance 2. The guide information may be composed of contents that can replace the cooking operation performed by the cooking appliance 2, and may be displayed on the display unit 151 of the user equipment 100 or output to the audio output unit 152.

The server 200 may provide the generated cooking command and guide information for the cooking appliance 1 to the user equipment 100 (S142). The user equipment 100 may control the cooking appliance 1 in accordance with the provided cooking command (S150). In addition, the user equipment 100 may output the guide information provided from the server 200 to the display unit 151 or to the audio output unit 152.

That is, when the cooking appliance which is not owned by the user or is not registered in the user account is included in the recipe of the product to be cooked, the cooking appliance control method according to another embodiment of the present disclosure allows the user equipment to output guide information that can replace the cooking appliance, so that it is possible to make it easier to cook the product to be cooked.

The present disclosure described above can be implemented with computer readable codes on a medium on which a program is recorded. The computer-readable medium includes all types of recording devices in which data readable by a computer system is stored. Examples of computer-readable media include a hard disk drive (HDD), solid state disk (SSD), silicon disk drive (SDD), ROM, RAM, CD-ROM, magnetic tape, floppy disk, and optical data storage device, etc. Also, the computer may include the processor 180 of the equipment.

While the embodiment of the present invention has been described with reference to the accompanying drawings, it can be understood by those skilled in the art that the present invention can be embodied in other specific forms without departing from its spirit or essential characteristics. Therefore, the foregoing embodiments and advantages are merely exemplary and are not to be construed as limiting the present invention.

What is claimed is:

1. A cooking appliance control system using artificial intelligence, the cooking appliance control system comprising:
   a user equipment which captures an image of a product to be cooked; and
   a server which performs vision recognition of the image and obtains information on the product to be cooked, wherein the server is configured to:
      retrieve a recipe to be applied to the product to be cooked, based on the information on the product to be cooked;
      generate a cooking command to be applied to a cooking appliance registered in a user account by using the recipe; and
      transmit the cooking command to the user equipment,
   wherein the user equipment is configured to control the registered cooking appliance in accordance with the cooking command, and
   wherein the user equipment is configured to receive storage environment information of the product to be cooked, and to control the registered cooking appliance in accordance with the cooking command to which the storage environment information has been applied.

2. The cooking appliance control system of claim 1, wherein the user equipment comprises:
   a display configured to display details of the cooking command and to display a cooking appliance to be controlled by the cooking command; and
   an input interface configured to receive a user input to control the cooking appliance displayed on the display.

3. The cooking appliance control system of claim 2, wherein the user equipment is configured to generate a cooking command changed by modifying the details of the cooking command by the user input.

4. The cooking appliance control system of claim 3, wherein the user equipment is configured to transmit the changed cooking command to the server, and
   wherein the server is configured to generate a user cooking characteristic learning model by using the changed cooking command.

5. The cooking appliance control system of claim 1, wherein the user equipment is configured to modify the cooking command by increasing a cooking time or a cooking temperature among the cooking command for the registered cooking appliance, when the storage environment information of the product to be cooked is a frozen storage.

6. The cooking appliance control system of claim 1, wherein, when there is a plurality of the cooking appliances capable of cooking the product to be cooked among the registered cooking appliances, the server is configured to generate cooking commands for the plurality of the cooking appliances respectively and to provide the cooking commands to the user equipment.

7. The cooking appliance control system of claim 6, wherein the server is configured to provide the user equipment with both a control command to be provided to the registered cooking appliance and information on a cooking method used in the cooking appliance required for the recipe, when the registered cooking appliance does not comprise a cooking appliance required for the recipe.

8. The cooking appliance control system of claim 7, wherein the user equipment is configured to output, on a display or in the form of sound, the information on the cooking method used in the cooking appliance required for the recipe.

9. The cooking appliance control system of claim 6, wherein the image of the product to be cooked comprises at least one of a packaging image of the product to be cooked, a logo image of the product to be cooked, and a content image of the product to be cooked.

\* \* \* \* \*